Dec. 5, 1950            G. T. BAKER            2,532,750
CALLING LINE IDENTIFIER HAVING DISPLAY
DEVICE AT OPERATOR'S POSITION
Filed June 13, 1947            8 Sheets-Sheet 1

INVENTOR
GEORGE T. BAKER
By
Young, Emery & Thompson
ATTYS-

Dec. 5, 1950  G. T. BAKER  2,532,750
CALLING LINE IDENTIFIER HAVING DISPLAY
DEVICE AT OPERATOR'S POSITION
Filed June 13, 1947  8 Sheets-Sheet 8

INVENTOR
GEORGE T. BAKER

Patented Dec. 5, 1950

2,532,750

UNITED STATES PATENT OFFICE 2,532,750

CALLING LINE IDENTIFIER HAVING DISPLAY DEVICE AT OPERATOR'S POSITION

George Thomas Baker, Liverpool, England, assignor to Automatic Telephone & Electric Company Limited, Liverpool, England, a British company Application June 13, 1947, Serial No. 754,562
In Great Britain August 3, 1946

5 Claims. (Cl. 179—27)

The present invention relates to telephone systems and is more particularly concerned with systems provided with facilities for identifying calling lines.

In the identification of calling lines there are two main problems to be considered. The first is that the identification cycle, that is the identification of the calling line and the transmission and display or recording of the identity signals should be accomplished as rapidly as possible in order that the connection does not have to be maintained longer than is absolutely necessary. The second is that the addition of line identification equipment to established exchanges should involve as little alteration to existing circuits as possible.

One of the objects of the present invention is to enable a further reduction in the duration of the identity cycle while a further object of the invention is to provide a line identification system which may be added to established exchanges without involving any very considerable alteration to the existing circuits.

According to one feature of the invention, the identification of a calling line and the transmission of identity signals to display equipment is initiated by the transmission of a signal and the equipment for responding to the identity signals is so arranged that the reception and display of the digits overlap.

According to a further feature of the invention, identity signals are transmitted direct to display equipment adapted to be associated with the connection and the arrangements are such that the display of a digit of the calling party's number takes place substantially immediately it is received.

According to a further feature of the invention, the identity of a calling line is displayed at an operator's position and the equipment which responds to the identity signals and controls the display is included in the operator's position equipment.

According to a further feature of the invention, in order to avoid the necessity of storing the digits at an operator's position where they are to be recorded or displayed, the operator's position equipment includes a key which is momentarily operated when the identity of a calling line is required, the initiation of the identification cycle taking place on the release of the key.

According to another feature of the invention, in response to the manipulation of a key at an operator's position an identification cycle is initiated and the number of the calling party is displayed at the operator's position, each subsequent manipulation of the key to check the number so displayed causing the complete identification cycle to be repeated.

The invention is preferably applied to a calling line identification system of the type disclosed in co-pending application No. 739,478, in which identification is effected by providing a pair of discs of non-linear resistance material for each line, the common side of the discs being connected to the fourth wire while the other side of one disc is multiplied for all lines having the same thousands and tens digit and the other side of the second disc is multiplied for all lines having the same hundreds and units digit. Coded marking signals are applied successively to the common leads and the discs of a calling line are biased to enable the marking current to flow over the fourth wire. Transmission of the signals is effected by voice frequency currents using two frequencies and a high speed of identification is obtained by employing high speed relays to control the application of the voice frequency current to the common lead, the high speed relays controlling circuits which include the primary windings of a number of transformers each of which has a plurality of secondary windings connected in the appropriate common leads.

Preferably the display equipment is of the type disclosed in co-pending application Serial No. 750,142, and employs a cathode ray tube on which the number is displayed. The arrangement is such that the first digit is displayed on the tube while the second is being received and the complete number is displayed for approximately 2½ to 3 seconds.

The invention will be better understood from the following description of one method of carrying it into effect, reference being had to the accompanying drawings in which.

Figure 1:
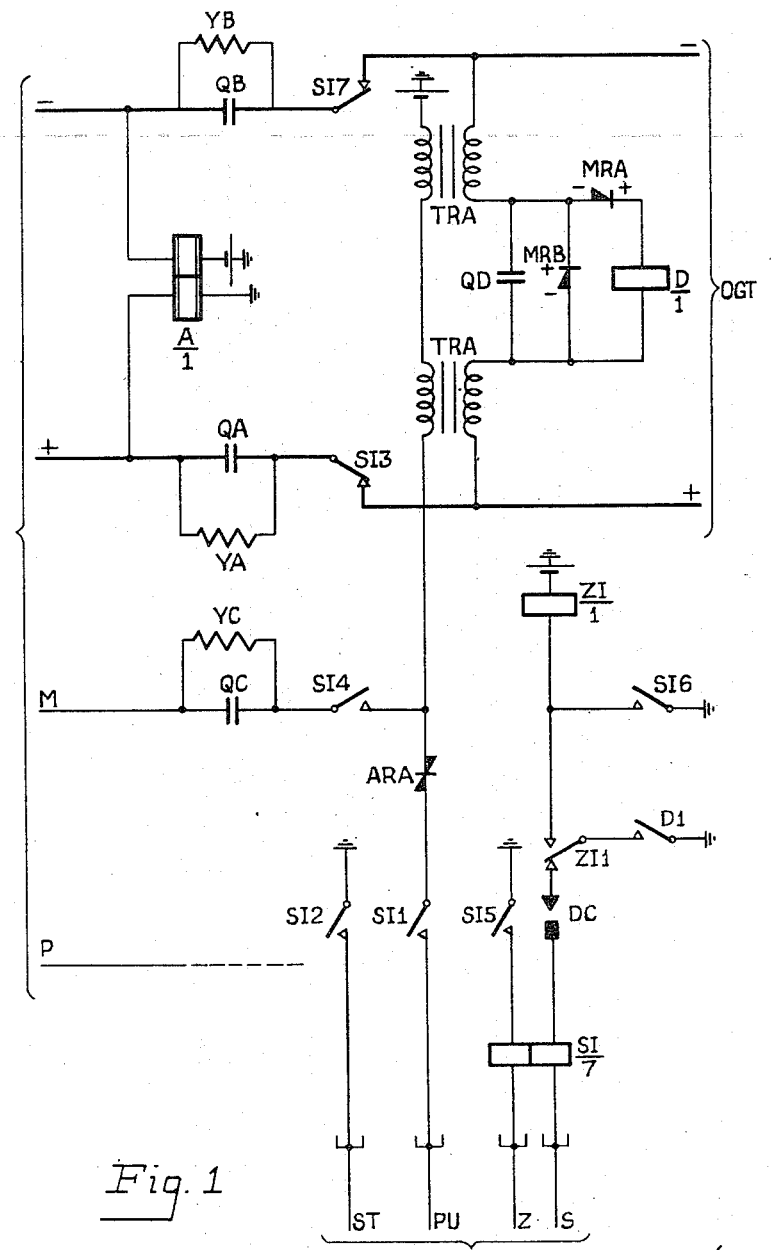
Fig. 1 shows the sending equipment located at the remote exchange.

Referring now to Fig. 1, this shows the basic unit that would be incorporated in the appropriate circuit at a remote exchange to pick up the identity on the fourth wire and to cause the transmission of the appropriate voice frequency signals over the junction line to the central or display exchange.

The discriminating contacts DC form part of the connecting circuit and indicate those calls on which identification is required. As an example, if the circuit formed part of a discriminating selector repeater the contacts would become normal post springs operating on level O and any other level requiring identification.

When these contacts are closed, the operation of relay D on battery reversal from the display exchange on the throwing of the appropriate key by the operator completes a circuit for relay SI to the S wire of the subscriber's line marking equipment SLME and, if the latter is available, SI energises. Relay SI at SI6 operates ZI, the latter disconnecting the original operate circuit, but SI remains locked over SI5 to the Z wire. The marking cycle is initiated by earth applied over SI2 to the ST wire and identity pulses of 750 C. P. S. are transmitted to line from the M wire over SI4. The 600 C. P. S. spacing pulses are received via the PU wire from SLME and the non-linear resistor ARA.

At the end of the identification cycle the removal of battery from the Z wire releases SI and at SI3 and SI7 the circuit restores to the speaking condition. Relay ZI remains held over DI and ZI1 and hence if the operator wishes to recheck, she re-operates the display key momentarily. This reverses the battery over the junction line as will be described subsequently and has the effect of releasing D and ZI. Hence, when D re-operates on the further battery reversal the marking cycle is again effected.

It will be noted that the line transformer TRA forms part of the transmission bridge thus dispensing with the usual impedance and slightly improving the transmission.

Figure 2:
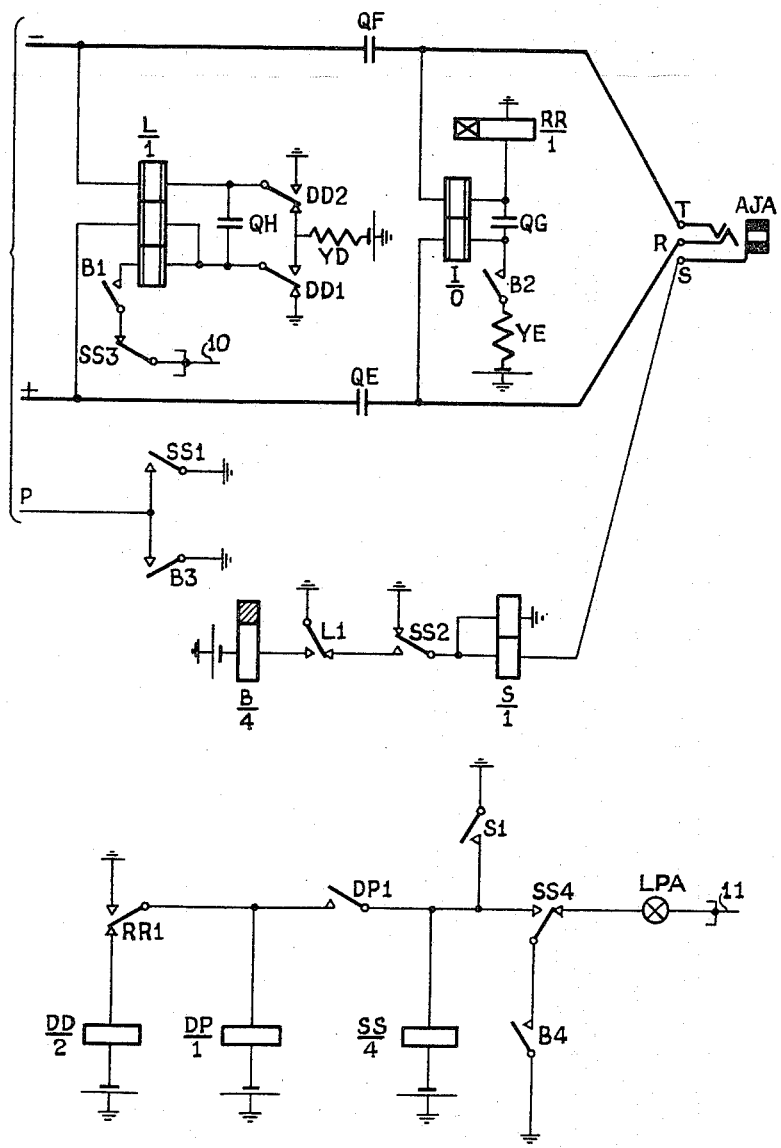
Fig. 2 shows the incoming junction circuit.

Fig. 2 shows the incoming end of the junction line shown in Fig. 1 and is standard in most respects, except that when the operator throws the display key, battery is connected to the (—) wire and RR operates. Relay RR in operating at RR1 energises DP which locks at DP1 so that when the key is released and RR de-energises, DD operates, S having operated followed by SS on the insertion of the answering plug in the jack. Relay DD extends a line reversal to the remote exchange to operate relay D which causes identification and transmission to take place as previously described.

If the key is re-operated the energisation of RR disconnects DD which removes the reversal as long as the key is depressed. The release of the key releases RR and re-energises DD which again reverses battery over the junction and causes the identification cycle to be repeated.

Figure 3:
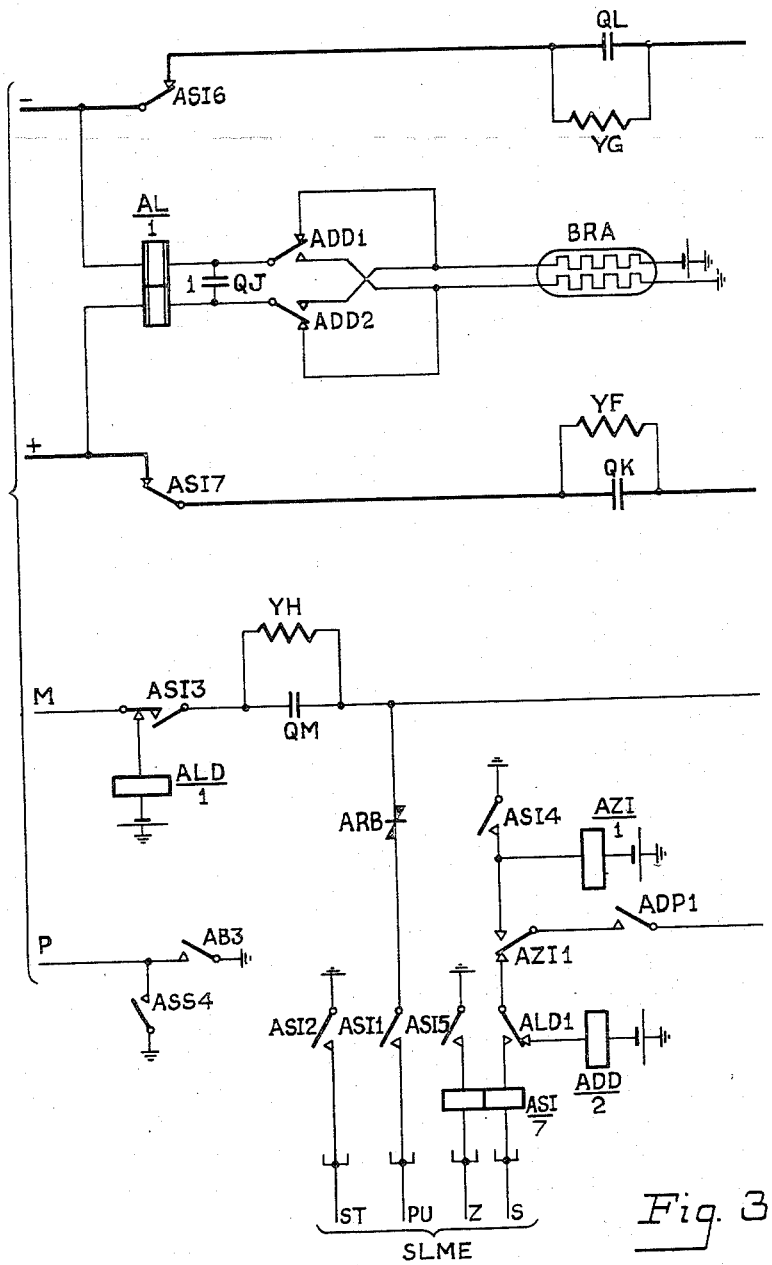
Figs. 3 and 4 show a main exchange circuit capable of dealing with incoming junction calls and main exchange calls which require identification, and Figs. 5, 6, 7 and 8 which should be arranged as shown in Fig. 9 show the display equipment and its connection to the operator's position equipment and the receiving equipment.
Figure 4:
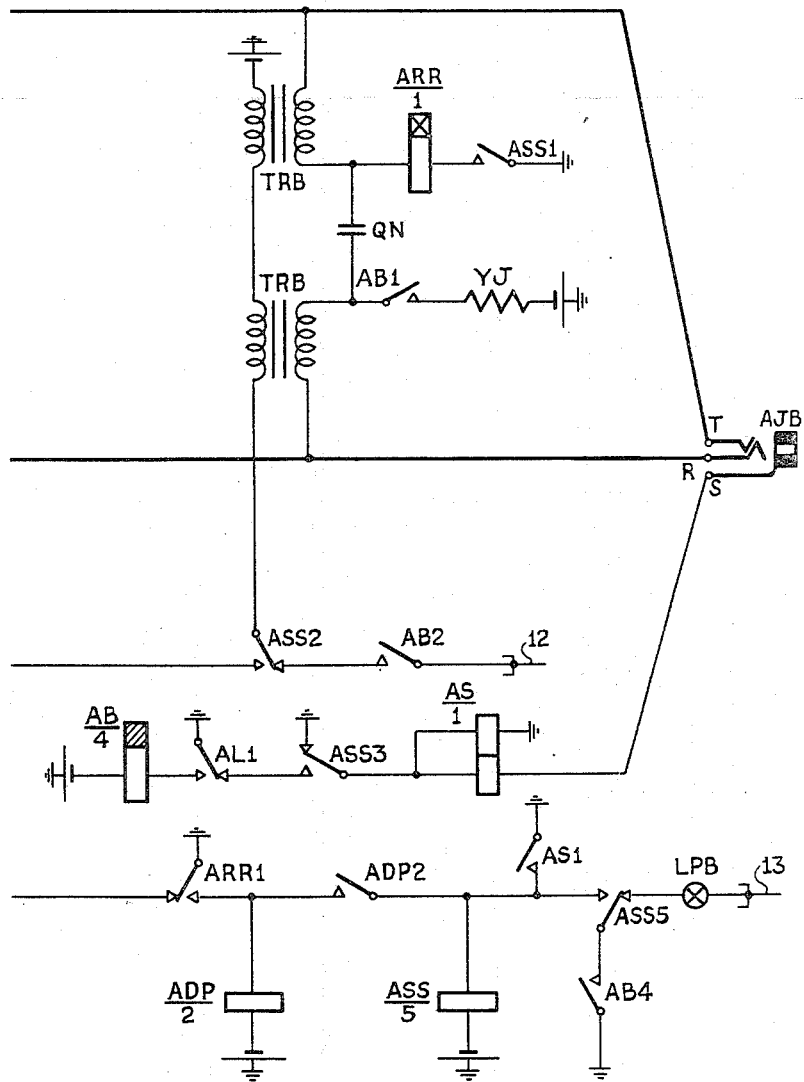

The circuit shown in Figs. 3 and 4 is a dual access circuit and caters for calls originated by subscribers on the exchange at which the circuit is located e. g. the central or display exchange or incoming over a junction from a remote exchange. In the former case the identity signals are received over the fourth or M wire, whilst in the latter case the signals would already be on the line wires, the transference being carried out by a circuit at the remote exchange similar to that shown in Fig. 1.

The discrimination is effected by relay ALD. Relays AS and ASS operate when the answering plug is inserted in the jack and since on a local call the M wire would be connected through the earth from the meter energises ALD. When the display key is depressed ARR operates followed by ADP. The release of the key releases ARR and completes a circuit for relay ASI over the S lead extending to the line marking equipment exactly as described for Fig. 1.

On an incoming call, no meter is connected and ALD remains normal. The depression of the key again operates ARR followed by ADP. Release of the key then releases ARR only and ADD operates over ALD1 normal and ADP1 operated to reverse the battery connections and the identification cycle and transmission of the identity signals is initiated.

It should be noted that a very similar circuit would be used at a tendem exchange to cater for calls originated at the tendem or transit calls. Relay ARR and the signalling resistance would be replaced by a D relay as shown in Fig. 1 and the outgoing end would be led to a junction instead of the jack.

Figures 5, 9:
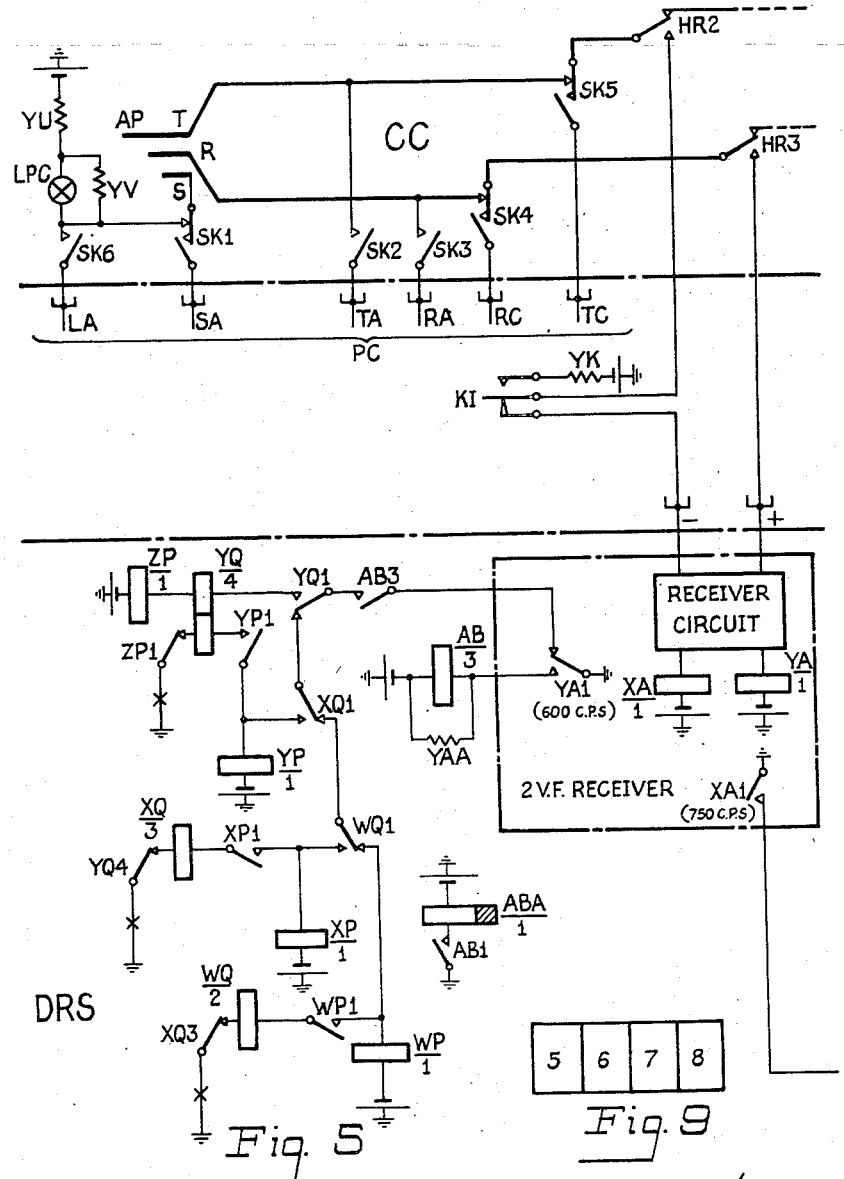
Figure 6:
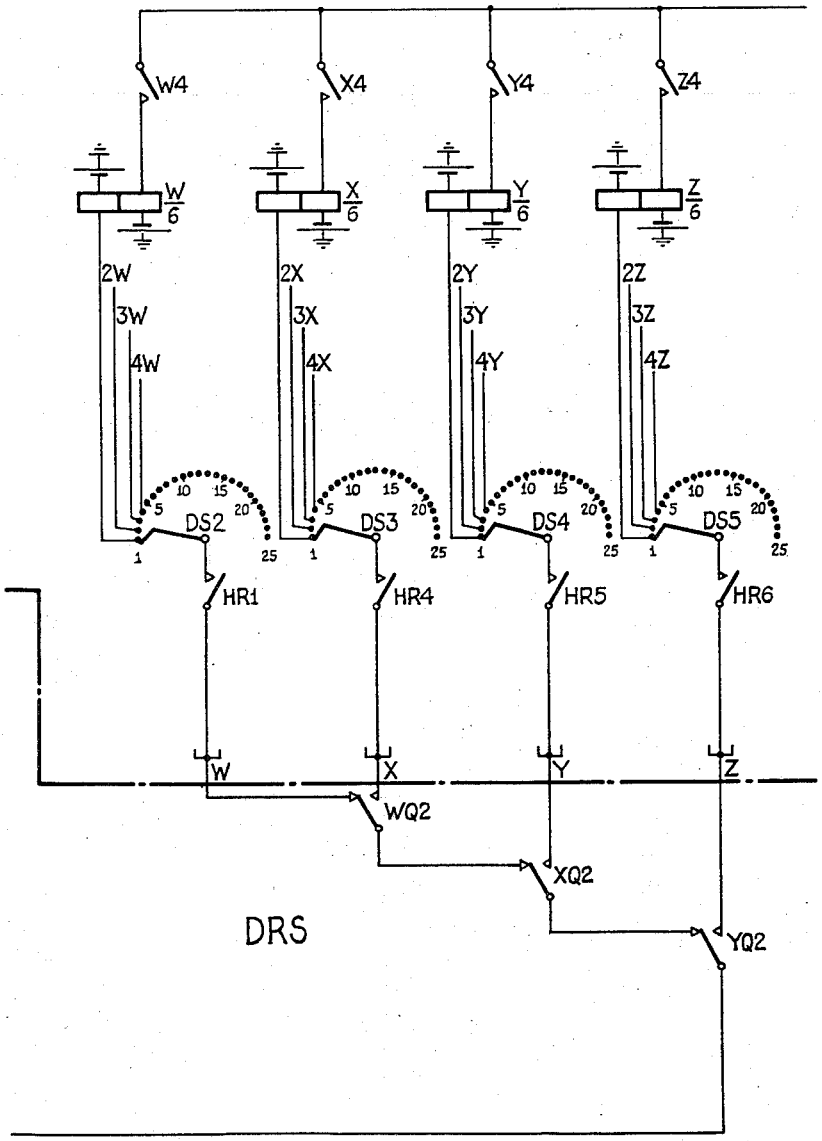
Figure 7:
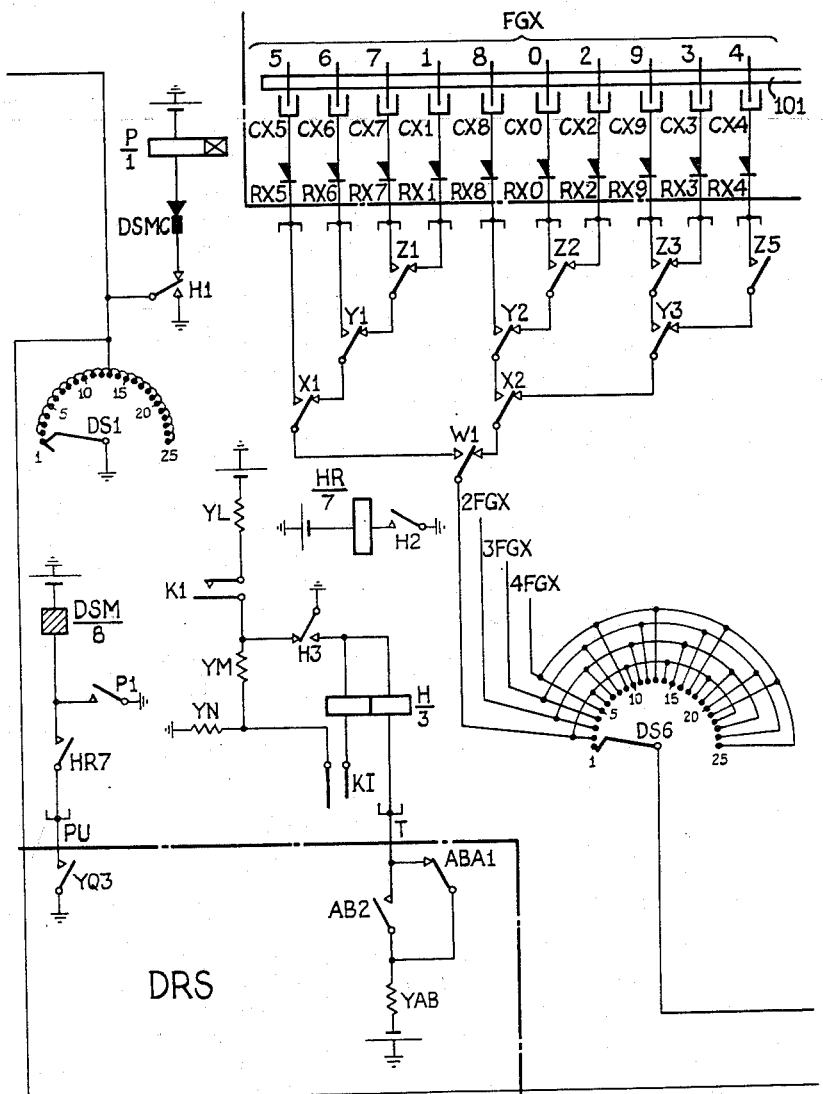
Figure 8:
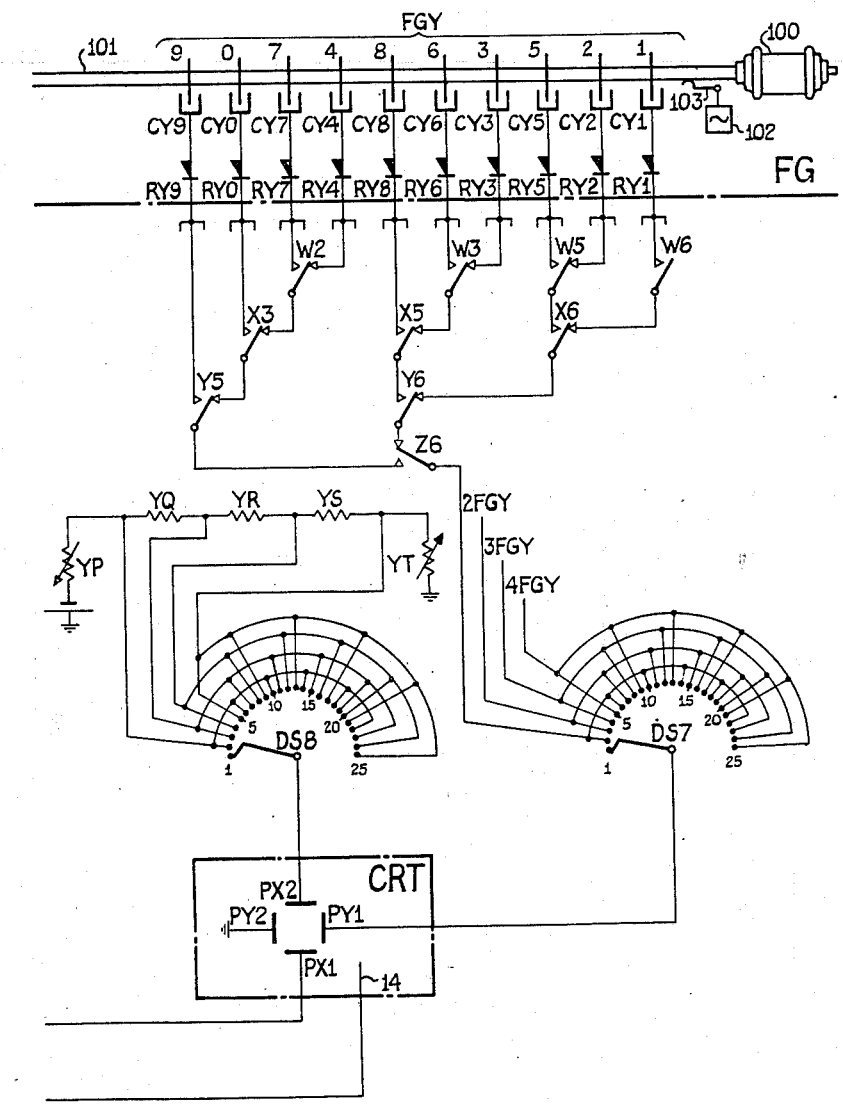

The position display equipment is shown in Figs. 5 to 8 which should be arranged as indicated in Fig. 9 to form a complete circuit. This equipment is connected into the usual position equipment as shown in Fig. 5 and it will be seen that no modifications to existing circuits are required, the HR contacts being merely inserted in the tip and ring commons on the answering side. When the display key KI is thrown a circuit is completed for relay H as follows, providing the distributor is free: earth, resistor YN, key KI, left-hand and right-hand windings of relay H in series, lead T, contact ABA1 in the distributor, resistor YAB to battery. Relay H operates and locks over its low resistance right-hand winding to earth at H3 and at contact H1 applies earth to lead 14 which is the brilliance control for the cathode ray tube and causes the spot to appear on the screen. Further, relay H at H2 completes a circuit for relay HR which operates. Relay HR in operating at contacts HR2 and HR3 extends the leads incoming over T and R to the receiver circuit of the 2 V. F. receiver. Further at contacts HR1 and HR4 to HR7 inclusive relay HR extends leads W, X, Y, Z and PU to the distributor.

The 2 V. F. receiver responds to the 600 and 750 C. P. S. signals and causes the operation of relay XA on the 750 C. P. S. signals and relay YA on the 600 C. P. S. signals. The signals are transmitted in a four-unit code of which the first element is referred to as W, the second as X, the third as Y and the fourth as Z. A short signal comprising a pulse of 600 C. P. S. current is first transmitted followed by the W, X, Y and Z elements with a pulse of 600 C. P. S. current between each. A 750 C. P. S. pulse is or is not transmitted in the W, X, Y and Z positions according to the code employed. This code is as follows.

|   | W | X | Y | Z |
|---|---|---|---|---|
| 1 | X |   |   |   |
| 2 |   | X |   |   |
| 3 |   |   | X |   |
| 4 |   |   |   | X |
| 5 | X | X |   |   |
| 6 | X |   | X |   |
| 7 | X |   |   | X |
| 8 |   | X | X |   |
| 9 |   | X |   | X |
| 0 |   |   | X | X |

It will thus be seen that for digit 1, a 750 C. P. S. signal will be transmitted in the W position but not in the X, Y or Z positions. Again the digit 8 will consist of a 750 C. P. S. signal transmitted in positions X and Y only.

The effect of the start signal, which consists of a 600 C. P. S. pulse will be to cause the operation of relay YA which at contact YA1 completes a circuit for relay AB. Relay AB is rendered slow-to-release by the resistor connected across its winding and is maintained operated for the duration of impulse reception. Relay AB in operating at contact AB1 prepares a circuit to the distributing relays, at AB2 completes an alternative holding circuit for relay H and at AB3 completes a circuit for relay ABA which operates. Relay ABA at contact ABA1 opens the original holding circuit for relay H.

Assume that the first digit to be received is the digit 7. Referring to the code it will be seen that a 750 C. P. S. pulse will be received in the W and Z positions. At the termination of the start pulse of 600 C. P. S., a 750 C. P. S. signal will thus be received. Relay YA releases at the end of the start signal and closes a circuit over YA1, B1, YQ1, XQ1, WQ1, winding of WP to battery. Relay WP operates. The reception of the 750 C. P. S. signal in the X position causes the operation of relay XA which extends earth over XA1, YQ2, XQ2, WQ2, lead W, HR1, DS2 on contact 1, left-hand winding of relay W to battery. Relay W operates and locks over its right-hand winding, W4 to earth at H1.

Relay XA releases at the end of the W pulse and relay YA again operates on the 600 C. P. S. spacing or synchronizing pulse. On the operation of relay YA, relay WQ operates in series with WP, the circuit being: earth, winding of WQ, WP1, winding of WP, battery. Relay WP remains held and relay WQ operates. It will be noted that prior to the release of relay YA, relay WQ was short-circuited by earth at both terminals. Relay WQ in operating at contact WQ2 disconnects lead W from contact XA1 and connects lead X thereto so that relay X will be capable of operation by the 750 C. P. S. X pulse. In the present instance, however, there will be no X pulse and hence relay X will not be operated. When relay YA releases at the end of the first spacing pulse, the following circuit is completed: earth, YA1, AB3, YQ1, XQ1, WQ1, winding of XP to battery. Relay XP operates and when relay YA operates at the end of the second spacing pulse, relay XP locks over XP1, winding of XQ, YQ4 to battery. Relay XQ operates and at XQ2 disconnects the X lead from contact XA1 and connects the Y lead thereto. In addition relay XQ at XQ3 opens the circuit for relays WQ and WP which thereupon release.

Relay XA does not operate in the Y position since no 750 C. P. S. pulse is received. Relay YA releases in the Y position and completes a circuit over YA1, AB3, YQ1, XQ1 for relay YP. Relay YP operates and, on the next operation of relay YA, locks over YP1, left-hand winding of YQ, ZP1 to earth. Relay YQ operates and at contact YQ2 disconnects lead Y from contact XA1 and connects lead Z thereto, while at contact YQ4 relay YQ opens the circuit for XQ and XP which release. A 750 C. P. S. pulse is received in the Z position so relay XA is energized. Relay Z is therefore operated and locks over Z4. In addition relay YQ at contact YQ3 extends earth over lead PU, contact HR7, winding of magnet DSM to battery. The magnet thus energizes preparatory to stepping the wipers. On the next release of relay YA i. e. in the Z position, a circuit is completed over YA1, AB3, YQ1, upper winding of YQ, winding of relay ZP to battery. Relay ZP operates and at contact ZP1, opens the circuit over the lower winding of relay YQ and the winding of relay YP. Relay YP releases but relay YQ remains operated until relay YA again operates when ZP and YQ both release and the distributing relays are in their initial position. Relay YQ in releasing at contact YQ3 opens the circuit of the magnet DSM whereupon the magnet releases and the wipers are stepped to position 2. Finally at contact YQ2 contact XA1 is again connected to lead W in preparation for the reception of the next digit.

The first digit is thus stored by the operation of the appropriate one or ones of the relays W, X, Y and Z. The wipers of the switch DS are in position 2 and the second digit is now stored in a similar manner to that described for the first digit. The storing relays for the second and subsequent digits are not shown but are connected to leads 2W, 2X, 2Y, 2Z; 3W, 3X, 3Y, 3Z; 4W, 4X, 4Y, 4Z in the same way as the relays W, X, Y and Z.

Relays W, X, Y and Z control the connections between the figure generator and the deflection plates of the cathode ray tube. The figure generator employed is the same as that described in my co-pending application Serial No. 750,142 and is shown schematically in Figs. 7 and 8. A motor 100 drives an electrically-conducting shaft 101 to which are secured the center plates of 20 capacitors CY1 to CY10 and CX1 to CX10. A source of alternating current 102 is connected to the shaft 101 by a brush 103 and the output from the capacitors is rectified by rectifiers RX1 to RX10 and RY1 to RY10. The center plates of the condensers are so shaped that the varying potentials obtained from the rectifiers when applied to the X and Y plates of the cathode ray tube cause the spot to make a trace on the screen representative of the required digits.

Connection is made from the metal rectifiers over contacts of the W, X, Y and Z relays to position 2 of wipers DS6 and DS7. Similarly connection is made to positions 3, 4 and 5 of said wipers over contacts of relays 2W to 2Z, 3W to 3Z and 4W to 4Z. These contacts are not shown but they are associated with leads 2FGX to 4FGX and 2FGY to 4FGY in the same way as that shown for the contacts of relays W, X, Y and Z.

In the present example involving the digit 7, relays W and Z are operated so that when the switch DS is stepped to position 2, the output from condenser CX7 is fed through rectifier RX7, contacts Z1, Y1, X1, W1, contact 2 and wiper DS6 to the plate PX1 of the cathode ray tube. Similarly the output from condenser CY7 is fed through rectifier RY7, contacts W2, X3, Y5, Z6, contact 2 and wiper DS7 to the plate PY1. This varying voltage output applied to the X and Y plates causes the spot to trace the digit 7 on the screen of the cathode ray tube and it is to be noted that this display of the first digit takes place while the second digit is being stored.

Bank DS8 of the uniselector DS provides a negative potential derived from potential divider YP, YQ, YR, YS and YT on the PX2 plate and causes the first digit to be displayed on the left of the screen. Contact 2 of bank DS8 causes a slightly less negative potential to be applied to PX2 so that the second digit is displayed slightly to the right of the first. Similarly the third and fourth digits are displayed further still to the right.

In this way all the incoming digits are received, stored and displayed, being placed next to each other across the screen by the action of bank DS3. When all the incoming digits have been received H and HR release, but the uniselector continues to step due to interaction between relay P and the magnet.

In the case of a four digit number, the first four contacts in the banks associated with wipers DS2, DS3, DS4 and DS5 are multipled round the bank so that on subsequent contacts all the digits are re-displayed in their original position and this repetition is continued until the uniselector reaches the home position. The speed of repetition is such that in conjunction with persistence of vision and the after-glow of the tube, cause the effect of a steady display.

When the uniselector homes, the holding earth is removed at DS1, all the relays de-energise and the spot disappears from the tube screen. The uniselector moves at slightly less than 10 impulses per second so that the display is visible for about 3 seconds.

I claim:

1. In a line identification system, a line, means for transmitting signals representative of the digits forming the numerical designation of said line, a receiving arrangement for receiving said signals, control means responsive to the operation of said receiving arrangement, registering means for each of said digits, a display device and means operative by said control means for connecting the registering means for one digit to said receiving arrangements and for simultaneously causing the display of the preceding digit on said display device under the control of the registering means for such digit.

2. In a line identification system, a line, a plurality of operator's positions, means for setting up a connection between said line and any one of said operator's positions, means for transmitting over said connection signals representative of the digits forming the numerical designation of said line, a display device associated with each operator's position, a receiving arrangement common to said operator's positions, means for associating said receiving arrangement with said connection to receive said signals, a switching device at each of said operator's positions operable to complete a circuit to initiate the operation of said transmitting means, control means responsive to the operation of said receiving arrangement, registering means for each of said digits and means operable by said control means for connecting the registering means for one digit to said receiving equipment and for simultaneously causing the display of the preceding digit on said display device under the control of the registering means for such digit.

3. In a line identification system, a plurality of lines, a plurality of operator's positions, means for setting up a connection from any one of said lines to any one of said operator's positions, means for transmitting over said connection signals representative of the digits forming the numerical designation of the line involved in said connection, a display device associated with each operator's position, a receiving arrangement common to said operator's positions, a non-locking key switch at each operator's position, means responsive to the momentary operation of said key switch at the operator's position to which said line is connected for associating said receiving arrangement with said operator's position to receive said signals, means responsive to the automatic restoration of said key switch for reversing battery potential over said connection to initiate the operation of said transmitting means and a display device controlled by said receiving arrangement for displaying for a predetermined time the digits of said numerical designation.

4. In a line identification system, a plurality of lines, a plurality of operator's positions, means for setting up a connection from any one of said lines to any one of said operator's positions, means for transmitting over said connection signals representative of the digits forming the numerical designation of the line involved in said connection, a display device associated with each operator's position, a receiving arrangement common to said operator's positions, means for associating said receiving arrangement with the operator's position to which said line is connected to receive said signals, registering means at said operator's position for each of said digits, a uniselector having a plurality of wipers and associated bank contacts, means for advancing said wipers one step on the reception of signals representative of a single digit, control means for connecting said receiving arrangement successively to the registering means for each digit over certain wipers and associated bank contacts of said uniselector, a plurality of waveform sources, means for selectively connecting said waveform sources under control of said registering means to bank contacts associated with other wipers of said uniselector and connections between said other wipers and said display device to cause the display of digits determined by the selected waveform sources, the bank contacts to which the registering means for one particular digit are connected corresponding to the bank contacts to which connections are made under the control of the registering means for the preceding digit whereby the registration of said one digit and the display of the preceding digit occur simultaneously.

5. A line identification system as claimed in claim 4 in which the bank contacts to which connections from said waveform sources are made are multiplied over the bank in order to provide a repeated display.

GEORGE THOMAS BAKER.

REFERENCES CITED

The following references are of record in the file of this patent:

UNITED STATES PATENTS

| Number | Name | Date |
|---|---|---|
| 1,846,261 | Kittredge | Feb. 23, 1932 |
| 1,846,516 | Haines | Feb. 23, 1932 |
| 1,859,475 | Skillman | May 24, 1932 |
| 1,864,553 | Quass | June 23, 1932 |
| 2,077,537 | Taylor | Apr. 20, 1937 |
| 2,242,285 | Blackwell | May 20, 1941 |
| 2,252,766 | Holden | Aug. 19, 1941 |
| 2,270,246 | Bascom et al. | Jan. 20, 1942 |
| 2,286,445 | Taylor et al. | June 16, 1942 |
| 2,319,424 | Maloney | May 18, 1943 |
| 2,341,934 | Martin | Feb. 15, 1944 |
| 2,387,897 | Grandstaff | Oct. 30, 1945 |